United States Patent [19]

Lorenz et al.

[11] Patent Number: 4,982,611

[45] Date of Patent: Jan. 8, 1991

[54] MULTIPLE-DEGREE-OF-FREEDOM SENSOR TIP FOR A ROBOTIC GRIPPER

[75] Inventors: Robert D. Lorenz, Madison, Wis.; Douglas M. Van De Riet, Holland, Mich.

[73] Assignee: Wisconsin Alumni Research Foundation, Madison, Wis.

[21] Appl. No.: 198,193

[22] Filed: May 24, 1988

[51] Int. Cl.⁵ .............................................. G01L 5/16
[52] U.S. Cl. .............................. 73/862.04; 73/862.54; 901/46
[58] Field of Search ........................ 73/862.54; 901/46

[56] References Cited

U.S. PATENT DOCUMENTS

| 4,099,409 | 6/1978 | Edmond | 73/862.04 |
| 4,414,984 | 11/1083 | Zarudiansky | 128/774 |
| 4,478,089 | 10/1984 | Aviles et al. | 73/862.04 |
| 4,526,043 | 7/1985 | Boie et al. | 73/862.04 |
| 4,555,954 | 12/1985 | Kim | 73/862.04 |
| 4,566,845 | 1/1986 | Mouhamed et al. | 73/862.04 X |
| 4,620,436 | 11/1986 | Hirabayashi et al. | 73/1 B |
| 4,640,137 | 2/1987 | Trull et al. | 73/862.04 |
| 4,658,233 | 4/1987 | Uchida et al. | 338/2 X |
| 4,694,231 | 9/1987 | Alvite | 73/862.04 X |
| 4,715,235 | 12/1987 | Fukui et al. | 73/862.68 |
| 4,745,812 | 5/1988 | Amazeen et al. | 901/46 X |
| 4,817,440 | 4/1989 | Curtin | 73/862.04 |
| 4,823,618 | 4/1989 | Ramming | 73/862.04 |

FOREIGN PATENT DOCUMENTS

| 755552 | 8/1980 | U.S.S.R. | 901/46 |
| 1232475 | 5/1986 | U.S.S.R. | 901/46 |
| 1271743 | 11/1986 | U.S.S.R. | 901/46 |
| 2036376 | 6/1980 | United Kingdom | 901/46 |

OTHER PUBLICATIONS

P. Dario et al., "An Anthropomorphic Robot Finger for Investigating Artificial Tactile Perception," The International Journal of Robotics Research, vol. 6, No. 3, Fall 1987, pp. 25-48.
R. Bajcsy, "What Can We Learn From One Finger Experiments," Robotics Research, Brady & Paul, editors, pp. 509-527, published prior to May 1987.
A. F. Davis, et al., "Corrugated PVDF Bimorphs as Tactile Sensors and Microactuators—a Research Note," Robotica (1983), vol. 1, pp. 239-240, pub. in 1984.
S. Hackwood, et al., "Torque-Sensitive Tactile Array for Robotics," 3rd Conference on Robotic Vision and Sensory Control, 1983, pp. 602-607.
R. Bardelli et al., "Piezo and Pyroelectric Polymers Skin-Like Tactile Sensors for Robots and Prostheses," 13th Internatonal Symposium on Industrial Robot Technology, vol. 2, pp. (18.45-18.56). The exact publication date is unclear but prior to May 1987, 12 pages.
L. D. Harmon, "A Sensor Touch Begins to Gather Momentum," Sensor Review, vol. 1, Nos. 2, Apr. 1981, pp. 82-87.
W. D. Hillis, "Active Touch Sensing," A. I. Memo 629, Massachusetts Institute of Technology Artificial Intelli- (List continued on next page.)

Primary Examiner—Tom Noland
Attorney, Agent, or Firm—Foley & Lardner

[57] ABSTRACT

A sensor tip (10) for use in a robotic hand has a three-dimensional compliant elastomeric body (12) with an outer boundary (22) having a circular base (24) and a convex surface (26) extending therefrom. Four strain transducers (14, 16, 18, and 20) produce electrical signals indicative of the strain at various positions near the boundary of the elastomeric body (12) resulting from forces exerted upon the sensor tip (10) by an object which the robotic hand is manipulating. The transducers (14, 16, 18, and 20) are positioned about the convex surface (26) so as to produce signals that may be decoupled to determine the normal and tangential forces and the applied torque. A signal amplifier (34) and computer (36) may be incorporated for the decoupling of the signals produced by the transducers (14, 16, 18, and 20) into the four components. The sensor tip can be produced at relatively low cost, requiring only low precision manufacturing processes.

39 Claims, 4 Drawing Sheets

OTHER PUBLICATIONS gence Laboratory, 1981, pp. 3-14, (appears complete).
E. Keller, "Piezoelectric Substances, Strain Gages, and Other Sensors Give Robots a Feel for the Job," Electronics, vol. 56, No. 23, Nov. 17, 1983, pp. 119-121.
E. Kolm et al., "How Piezoelectric Devices Earn Their Keep," Chemtech,, vol. 13, 1983, pp. 180-186.
D. H. Mott et al. "An Experimental Very High Resolution Tactile Sensor Array," Proceedings of the 4th International Conference on Robot Vision and Sensory Controls, pp. 241-249, published prior to May 1987.
T. J. Nelson et al., "Shear-Sensitive Magnetoresistive Robotic Tactile Sensor," preprint dated Mar. 12, 1986, 8 pages.
K. E. Pennywitt, "Robotic Tactile Sensing," Byte, Jan. 1986, pp. 177-200, (entire 14 page article apparently submitted with unneeded pages in page range omitted).
J. A. Purbrick, "A Force Transducer Employing Conductive Silicone Rubber," Proceedings of the 1st International Conference on Robot Vision and Sensory Controls, Apr. 1-3, 1981, pp. 73-79.
M. H. Raibert et al., "Design and Implementation of a VLSI Tactile Sensing Computer," The International Journal of Robotics Research, vol. 1, No. 3, 1982, pp. 3-17.
J. Rebman et al., "A Tactile Sensor with Electrooptical Transduction," Proceedings of the 3rd International Conference on Robot Vision and Sensory Controls, 1983, pp. 210-215.
R. N. Stauffer, "Progress in Tactile Sensor Development," Robotics Today, vol. 5, No. 3, Jun. 1983, pp. 43-45, 48, and 49.
W. E. Snyder et al., "Conductive Elastomers as Sensor for Industrial Parts Handling," IEEE Transactions on Instrumentation and Measurement, vol. IM-27, No. 1, Mar. 1978, 00, 94-99.
J. Severwright, "Tactile Sensor Arrays: The Other Option," Sensor Review, Jan. 1983, pp. 27-29.
B. E. Robertson et al., "Tactile Sensor System for Robotics," 12th International Symposium on Industrial Robotics, pp. 572-577, published prior to May 1986.
K. Tanie et al., "A High Resolution Tactile Sensor," Proceedings of the 4th Internatonal Conference on Robot Vision and Sensory, Controls, pp. 251-260, published prior to May 1987,
J. M. Vranish, "Magnetoresistive Skin for Robots," Proceedings of the 4th International Conference on Robot Vision and Sensory Controls, pp. 269-283, published prior to May 1987.
"Sensors for Intelligent Robots," in Robot Control, pp. 220-230, published by Aug. 1988.
*Introduction to Organic Chemistry, 2nd Edition;* pub. 1981; Andrew Streitwiesser, Jr. et al, p. 610.

MULTIPLE-DEGREE-OF-FREEDOM SENSOR TIP FOR A ROBOTIC GRIPPER

FIELD OF THE INVENTION

This invention relates generally to robotics, and particularly to tactile sensors for use in robotic grippers where force feedback information is needed.

BACKGROUND OF THE INVENTION

Robots are increasingly being employed in tasks that are otherwise dangerous or tedious to humans. The utility of a robot can be increased when tactile sensors are incorporated into the hands or grippers of the robot to enable the robot to "feel" objects in its environment. Ideally, a robotic hand should be able to hold an object tight enough to keep the object from slipping from its grasp, yet be gentle enough to keep from crushing or breaking the object. This desired sensitivity has been typically attempted by mounting a two dimensional array of independent pressure sensitive sensors on the hand of the robot which are linked together by computer software to determine the forces exerted by the object being grasped at different positions on the array. Such arrays can detect only one degree of freedom, i.e., they can only detect forces normal to the robotic hand and cannot sense tangential or torsional forces.

The one-dimensional pressure sensitive arrays of the prior art use a number of different types of sensing elements. The sensing elements may include conductive rubber, piezoresistive and piezoelectric elements, optical methods using indices of refraction, electro-optical transduction, and fiber optics. Each of these methods has its respective advantages and disadvantages, though all suffer from the inability to detect more than just normal force components. The prior art tactile sensors therefore are unable to detect tangential forces created when an object is slipping from the robotic hand, nor can the prior art sensors relay information relating to torsional forces created when an object is grasped away from the center of gravity. Many of the prior art devices have an insufficient range of force detection and high hysteresis, or require long computer processing times.

Although tactile sensors having the ability to detect multiple force components have been the subject of recent research, sensors with such capabilities are presently available only in applications where each force component is measured independently. These sensors are too large for reasonable use in a robotic hand.

For the aforementioned reasons, not many robots are currently using tactile sensors. There are, however, many possible applications for tactile sensors. Among them are adaptive grasping; automated wiring; cutting; handling soft, light, or limp materials; pressure distributions in gaite (feet) as well as whole body analysis; prosthetic systems; machine loading and unloading; detection of jamming during insertion; bulk part removal; rivet insertion; leather grading; weld tracking and inspection; underwater geological prospecting; sheep shearing; industrial floor sweeping; automatic repair (as in space and nuclear reactor installations); chemical and pharmaceutical handling; harvesting; shelling; flower and plant handling; poultry plucking; and cheese ripeness testing. Although not a complete list, this sampling shows that satisfactory sensors could find a wide variety of applications.

To meet these diverse applications, tactile sensors should be three-dimensional and have multiple degrees of freedom, i.e., be able to accurately detect multiple force components. Preferably, the tactile sensor should be able to detect four degrees of freedom one normal force, two tangential forces, and one torsional force or torque. A tactile sensor should be chemically inert and robust, that is, not be sensitive to abuse. The tactile sensor should have minimal manufacturing costs and should preferably be disposable, easily replaced, and/or repairable. A tactile sensor should also be compliant so that it will not damage the object being manipulated and so that the force control of the robotic system can be facilitated. Stiff force sensors are generally undesirable for force controlled robotic systems.

SUMMARY OF THE INVENTION

The three-dimensional sensor tip in accordance with the present invention, is capable of being contacted from three orthogonal directions and of providing signals indicative of the force and/or torque components acting upon the sensor tip at the point of contact. The sensor tip has an elastomeric body shaped to have a circular base and a convex surface extending therefrom. Four transducers that convert strain in the body to output voltage are placed about the convex surface and provide electrical output signals which may be combined to produce signals corresponding to the force components acting at the point of contact.

The elastomeric body of the sensor tip is preferably approximately the size of an adult male thumb, and may be composed of silicone rubber, which is chemically inert and approximately as compliant as human flesh. Though easily deformable, the material displays low hysteresis and good repeatability. Its compliance is preferably greater than that of the objects which will be grasped, so that substantially all advancement of the sensor tip toward the object after initial contact occurs because of compression of the sensor tip rather than the object. Because the stress-strain relationship of the sensor material is known (whereas that of the object may not be known) the actual amount of force (or pressure) exerted by the sensor on the object can be determined. The sensor tip is preferably in the shape of one-half of an ellipsoid taken along its major axis, the ratio of the major axis to minor axis being preferably about 1.6 for optimal signal amplitudes.

The four transducers are positioned in selected positions and orientations about the convex surface of the sensor tip and are preferably composed of a piezoelectric polymer film having lead wires attached. The wires carry the signals of electrical voltage that correspond to the deformation, or strain, experienced by the elastomeric body. The signals are amplified by a signal amplifier, and then are provided to a hard wired processing circuit or a computer which decouples the electrical signals into the individual force components. The decoupling is readily accomplished in that the interactions between the transducers are well understood and lend themselves to decoupled calibration means.

The sensor tip typically forms part of a finger in a robotic hand for grasping objects. When there are three or more fingers in a robotic hand, the sensor tip may emulate the human hand by determining the forces exerted upon the robotic hand by the objects being manipulated. Incorporation of a three-fingered robotic hand, each finger of which can determine multiple force components, enables the robot to form a three-point three-dimensional grasp that provides a better, more stable grip than conventional two point grips. The sensor tip of the present invention provides feedback information that allows the robot to sense when the object has been contacted, when it is slipping from the hand, or when the object has been picked up away from the center of gravity, as well as allowing the amount of force exerted on the object by the sensor tips to be monitored.

The sensor tip can be easily constructed with minimal material, manufacturing and calibration costs, yet can be rugged and remain accurate over a large range of applied forces. Similar to the tactile sense of human fingertips, the incremental resolution is high without the need for high absolute accuracy. Absolute positioning of the transducers on the tip body is not critical, as a decoupling calibration is easily performed.

Further objects, features, and advantages of the invention will be apparent from the following detailed description taken in conjunction with the accompanying drawings.

DESCRIPTION OF THE PREFERRED EMBODIMENT

Figure 1:
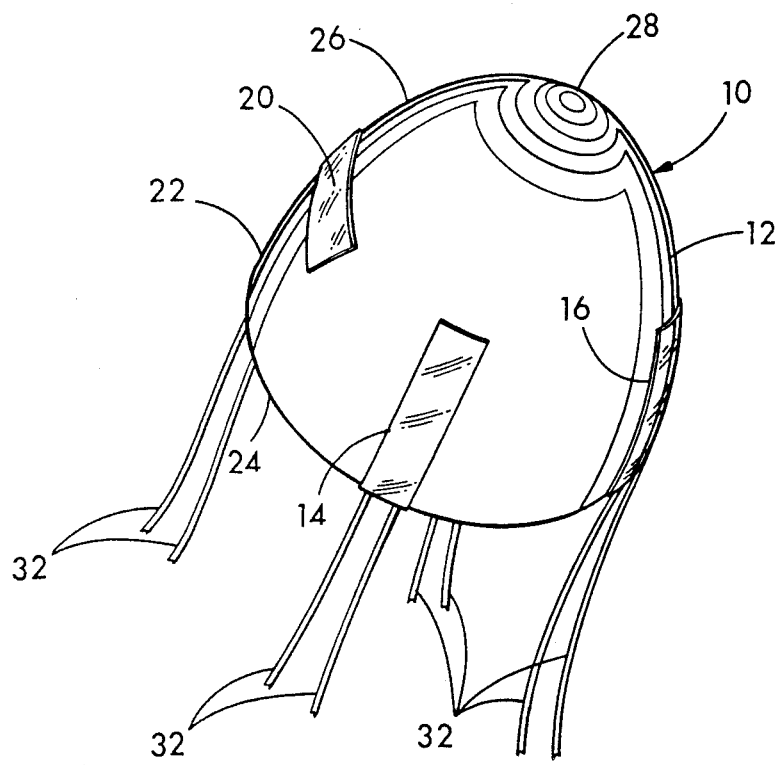
FIG. 1 is a perspective view of the sensor tip of the present invention.
Figure 2:
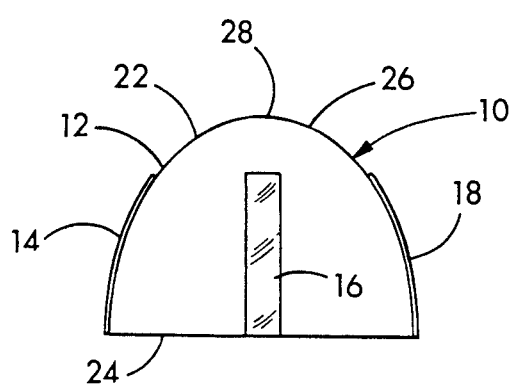
FIG. 2 is a side plan view of the sensor tip.
Figure 3:
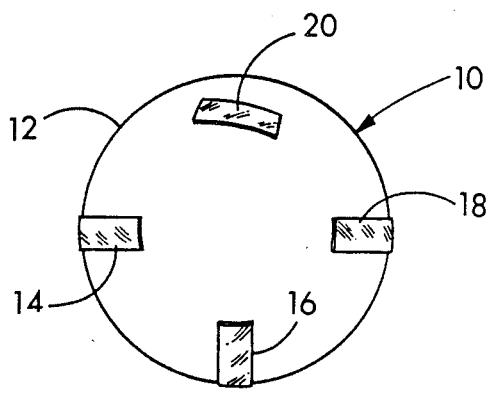
FIG. 3 is a top plan view of the sensor tip.

With reference to the drawings, a preferred embodiment of a sensor tip constructed in accordance with the invention is shown generally at 10 in FIGS. 1, 2, and 3. The sensor tip 10 is adapted for use in a robotic hand capable of grasping and manipulating an object and provides feedback information on forces acting upon the sensor tip 10 by the object. The elements of the preferred sensor tip 10 include an elastomeric body 12 and four transducers 14, 16, 18, and 20. The elastomeric body 12 is preferably approximately as compliant as human flesh and may be, for example, approximately the size of a male adult thumb. The body 12 has a 3-dimensional outer boundary 22 so that the body 12 is capable of being contacted from three orthogonal directions. The outer boundary 22 is preferably shaped to have a circular base 24 and a convex surface 26 extending therefrom. The convex surface 26 has a distal point 28 of maximal distance from the base 24. The four transducers 14, 16, 18, and 20 are positioned near the base 24 along, or preferably slightly submerged beneath, the outer boundary 22. The transducers 14, 16, 18, and 20 are positioned about the periphery of the convex surface 26 in pre-selected locations and orientations with modest precision requirements. The transducers 14, 16, 18, and 20 produce an electrical signals indicative of strain in the elastomeric body 12. The strain in the elastomeric body 12 results from the forces acting upon the body 12 by the object which the robotic hand is manipulating.

The material for the elastomeric body should have consistent mechanical properties, low hysteresis, retention of its resilient properties even under large deformation, and should not deteriorate when exposed to sunlight or common industrial chemicals. Silicone rubber is an example of a preferred material which generally meets these requirements. Silicone rubber is isotropic because of its molecular structure, and it has a constant Young's modulus over a broad temperature and deformation range with unique linearity compared with other elastomers. Silicone rubber will maintain its flexibility almost indefinitely at moderately elevated temperatures. It has a very good resistance to outdoor weathering and to low concentrations of acids, bases, and salts. A preferred silicone rubber is room temperature vulcanized, has a Shore Hardness rating in the range of 45-55, has a relatively short curing time, and is flowable in its uncured state so that the silicone rubber can be poured into a mold (e.g., Dow Chemical RTV 3110). Silicone rubber in the prescribed hardness range is stiff enough to be durable, yet possesses enough compliance for adaptive grasping for most purposes. In general, the material of the body 12 should be at least as compliant as, and preferably more compliant than the object being grasped by the robotic hand.

The outer boundary 22 of the elastomeric body 12 is preferably rounded to a convex surface 26 because sharp corners produce inconsistent load distributions, stress concentrations, and other irregularities. The convex surface 26 of the outer boundary 22 is preferably shaped as a portion of an ellipsoid, the body 12 forming one-half of the ellipsoid as taken along its major axis. It has been found that the sensitivity of the transducers 14, 16, 18, and 20 improve as the slope of the outer boundary 22 of the body 12 at the base 24 becomes closer to a perpendicular to the base. Hence, a configuration which is half of an ellipsoid is generally preferred over other configurations, such as a paraboloid. In order to optimize both the signal output from the transducers 14, 16, 18, and 20, and the mechanical characteristics of the body 12, the ratio of the major axis to the minor axis of the ellipsoid is preferably about 1.6. With respect to signal production from the force transducers 14, 16, 18, and 20, the sensor tip 10 should produce signals of the greatest amplitude for a given force that acts upon the sensor tip 10. A short, stout, elastomeric body is not desirable in that it will not produce large signals when subjected to either normal or tangential forces. However, an elastomeric body which is excessively tall and thin is easily broken and subject to deflections which can lead to large non-linearities. It has been found that the body 12 is preferably formed in a range where the ratio between the major axis and the minor axis of the ellipsoid is between 1.0 (hemispherical) and 2.0. The lower end of the range has more difficulties in signal propagation, especially in a direction normal to the body 12, whereas the higher end of the range has more mechanical problems. As noted above, the optimal ratio of the major axis to the minor axis is 1.6. This equates to a ratio of 0.8 when the ratio is taken of the maximal distance between the base 24 and distal point 28 with respect to the diameter of the base 24. Similarly, the range of ratios between the major axis and minor axis of the ellipsoid of between 1.0 and 2.0 as specified above, equates to a range of 0.5 to 1.0 when the ratio is taken of the maximal distance between the base 24 and the distal point 28 with respect to the diameter of the base 24.

In the optimization of the sensor tip shape, an additional consideration is the proportionality of the amplitudes of signal outputs of the transducers 14, 16, 18, and 20 to the actual magnitude of the force components applied, referred to herein as the sensitivity ratio. For example, the tangential forces will generally be about one-sixth the magnitude of the normal forces based upon the friction coefficients of rubber (the elastomeric body 12) and steel (a common material for an object manipulated by a robot). An optimal senstivity ratio is 1/6 where the sensitivity ratio is defined as the ratio of the signal output due to normal forces to that produced by a tangential force of the same magnitude. Good results are obtained with an ellipsoid having a 1.6 ratio (major axis to minor axis), resulting in a sensitivity ratio of 0.16.

The transducers 14, 16, 18, and 20 convert displacement of the elastomeric body 12, i.e. strain, into an electrical output. Suitable preferred transducers are strips of piezoelectric polymer film that convert strain to voltage. The piezoelectric polymer film is preferably composed of polyvinylidene fluoride (PVDF or $PVF_2$), a material which is not brittle, has high piezoelectric sensitivity, and can be formed into desired shapes. Suitable PVDF film is commercially available from the Penwalt Corporation under the trademark KYNAR. The PVDF can be manufactured quite thin, and since it has a fairly low modulus of elasticity, it is easily strained and will not materially affect the mechanical properties of a soft substrate, such as the elastomeric body 12. The piezoelectric film is anisotropic and this is considered a desirable attribute of the film in that it allows greater independence of signals between transducers 14, 16, 18, and 20 in response to applied loads. For transducers 14, 16, and 18, the orientation of the anisotropism should be directed generally from the distal point 28 toward the periphery of the base 24. For the transducer 20, the orientation of the anisotropism should preferably be directed helically about the convex surface 26.

A suitable thickness of the polymer film of the transducers 14, 16, 18, and 20 is 28 microns, though other thicknesses may also be operable with the present invention. The thickness of the above-described piezoelectric film, however, generally has no influence on the signal response. A suitable size for the polymer strips is 0.5 inch × 0.25 inch on a sensor tip having a 1.6 elliptical ratio and which is approximately 1.0 inch from the base 24 to the distal point 28. Though large pieces of film produce a desirable, stronger signal, this must be weighed against potential difficulties with bonding of a larger piece of film to the silicone rubber of the convex surface 26. Smaller pieces of film should be used in high load applications because the shorter pieces stay bonded to the rubber under high stresses better than longer pieces of piezoelectric film. The bonding of the transducers 14, 16, 18, and 20 to the body 12 at the convex surface 26 is discussed further below.

Figure 4:
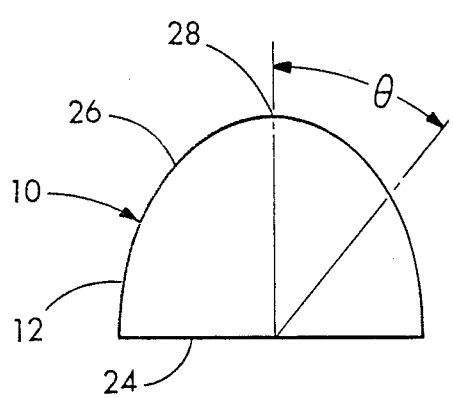
FIG. 4 is a simplified side view of the sensor tip, showing the possible locations of the center of the piezoelectric polymer film transducers along the convex surface of the elastomeric body on an angle $\theta$, the angle being taken from a line normal to the base.

The position of the transducers 14, 16, 18, and 20 on the concave surface 26 is also important to an optimization of both the signal magnitude and for the ideal sensitivity ratio. Near the base 24 of the sensor, it has been found that the strain is dominated by bending, while at the distal point 28 of the sensor tip 10 the compression forces on the surface of the rubber as created by the tangential force applied in shear is dominant. In order to obtain the desired sensitivity ratio of 1:6, experiments have shown that the film should be positioned such that the angle $\theta$ is 70° from the center of the film to a line normal to the base 24 through the distal point 28, as depicted in FIG. 4.

Figure 6:
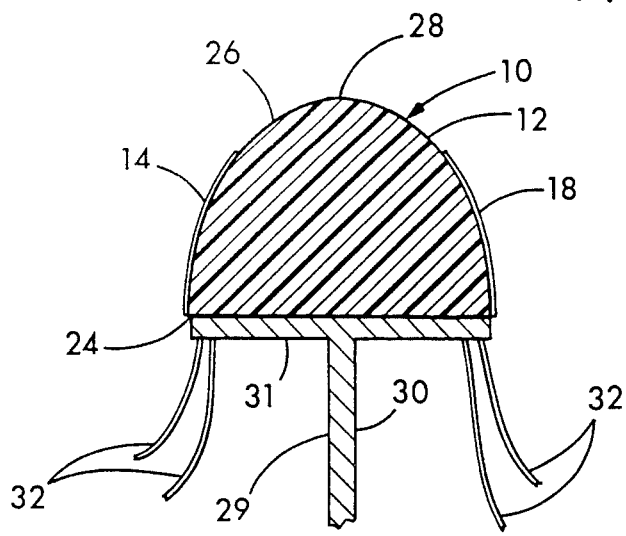
FIG. 6 is a cross-section through the sensor tip showing the sensor tip attached to a finger member.

The sensor tip 10 would be typically from part of a finger for a robotic hand, gripper, probe, or the like. An example of such a configuration is shown in FIG. 6. The robot finger of FIG. 6 includes a finger support member 29 having a shaft 30 and a flat support plate 31 mounted to the top of the shaft. The support member 29 is preferably made of a strong structural material, such as steel. The base 24 of the tip 10 is glued or otherwise firmly affixed to the top of the plate 31 which has openings through which the lead wires 32 pass.

Figure 7:
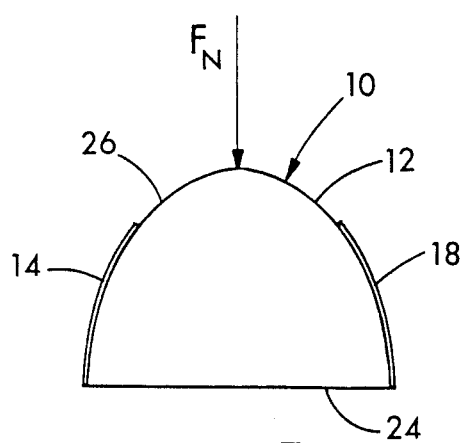
FIG. 7 is an illustrative view of a normal force acting upon the sensor tip.
Figure 8:
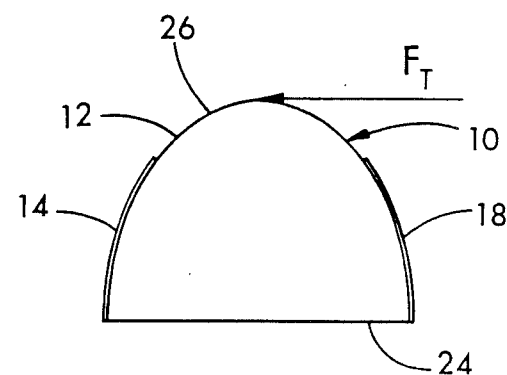
FIG. 8 is an illustrative view of a tangential force acting upon the sensor tip.

Having a three-dimensional outer boundary 22, the sensor tip 10 is capable of experiencing force components from three orthogonal directions (a normal force and two tangential forces), as well as a torque acting around an axis extending normal to the base 24 and through the distal point 28. The transducers 14, 16, 18, and 20 are placed around the circular base 24 at separated positions to enable the determination of the independent (orthogohal) force and torque components from the output signals produced by the transducers. When a force is applied to the sensor tip 10, the elastomeric body 12 deforms, causing the piezoelectric transducers to be strained and emit electric signals directly related to the strain. As an example of the forces acting upon the sensor tip 10, the two-dimensional example of FIGS. 7 and 8 may be considered. The sensor tip 10 of FIG. 7 is shown experiencing a purely normal force, causing compression in both transducers 14 and 18. If a change occurs in the normal force applied to the sensor tip 10, a corresponding and proportional change in the signals from the transducers 14 and 18 will result. Even if another component is applied simultaneously, the change in signals due to the change in the normally applied forces should change linearly with the amplitude of the change in normal force. For the case of the tangential force applied to the tip as shown in FIG. 8, a tangential force as depicted will cause a compression in the transducer 14 and tension in the transducer 18. To resolve forces in three orthogonal directions (one normal and two tangential force components), an additional transducer 16 is required. A fourth transducer 20 is necessary if a fourth component, torsion about the axis normal to the base 24 through the distal point 28, is to be monitored. As mentioned earlier, because of the anisotropic effects of the film forming the transducers 14, 16, and 18, the transducers should be oriented radially toward the distal point 28 and positioned such that an angle of 70° is formed from the center of the transducer film to a line normal to the base 24 through the distal point 28. Preferably, the film forming the transducer is cut with a greater length than width, and such that the anisotropism causes the greatest change in output signal with strain to occur along the length of the transducer. The transducer 20 measures the torque about the line normal to the base 24 through the distal point 28, and the transducer film is preferably oriented so that the anisotropism of the transducer 20 is helical with the convex surface 26, as that is the direction of the torsional component.

To measure three force components, at least three strain transducers must be used. Similarly, the measurement of four components (three independent forces and a torque) requires at least four transducers. However, the transducers produce signals that are cross-axis sensitive. That is, the application of any force, whether it is normal or tangential, will produce signals from all of the transducers simultaneously. It is therefore necessary to decouple these signals into the individual components of the applied force and/or torque components. In performing the decoupling of the signals into the individual components, it is generally adequate to assume that the signals are linear functions of the strain experienced by the transducers. The sensor tip 10 may be calibrated by application of each force (or torque) in its pure form and measurement of the signal from each transducer. A proportionality constant is then derived for each transducer by dividing the amplitude of the signal from that transducer by the applied force. This may be expressed in the following equation:

Measured signal $(s_i)$ = [constant$(k_{ij})$] × [Applied force$(f_j)$]

or $k_{ij} = s_i/f_j$, where $k_{ij}$ is the proportionality constant found by dividing the amplitude of the signal from the transducer $(s_i)$ by the applied force $(f_j)$. After each force has been applied and the signals from each transducer are recorded for each force, a table of proportionality constants is created as shown in Table I.

TABLE I

| Force Applied | Transducer #1 | Transducer #2 | Transducer #3 | Transducer #4 |
|---|---|---|---|---|
| Normal | $k_{11}$ | $k_{12}$ | $k_{13}$ | $k_{14}$ |
| Tangential #1 | $k_{21}$ | $k_{22}$ | $k_{23}$ | $k_{24}$ |
| Tangential #2 | $k_{31}$ | $k_{32}$ | $k_{33}$ | $k_{34}$ |
| Torsional | $k_{41}$ | $k_{42}$ | $k_{43}$ | $k_{44}$ |

Since the signals are assumed to be linear for each degree of freedom, the results can be added together as follows:

$s_1 = k_{11}f_1 + k_{12}f_2 + k_{13}f_3$,
$s_2 = k_{21}f_1 + k_{22}f_2 + k_{23}f_3$,
$s_3 = k_{31}f_1 + k_{32}f_2 + k_{33}f_3$, and
$s_4 = k_{41}f_1 + k_{42}f_2 + k_{43}f_3 + k_{44}f_4$.

In matrix form, this will yield:

$s = [k]f$, where s is the column matrix of signals from the four transducers, [k] is the matrix of constants, and f is the column matrix of applied forces. In order to decouple the forces into the three force components (normal and two tangential forces), the matrix equation is solved for f to obtain the following relation.

$f = [k]^{-1}s$.

The result is a measure of the three independent force components and the torque component as a function of the signals from each of the transducers 14, 16, 18 and 20.

The matrix of constants, [k], depends on where the transducers are positioned on the body. As might be expected, there will be small errors in the coefficient matrix, [k], that grow during the matrix manipulation used to determine f. Two methods may be used to reduce the error in the estimate of the force components. The first method is simply to use more accurate and precise methods both in taking measurements of the signals and in applying the pure force components. The second method of reducing errors when decoupling involves the optimal positioning of the transducers on the sensor tip 10.

Figure 5:
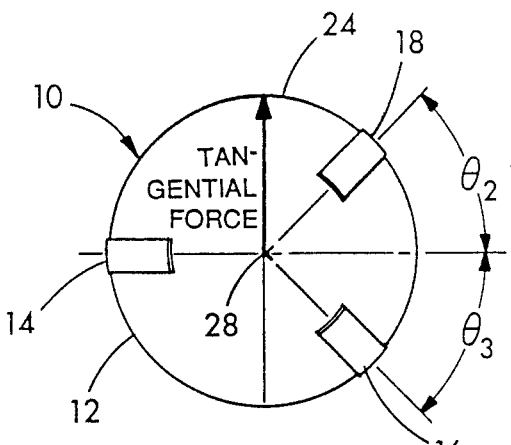
FIG. 5 is a simplified top view of the sensor tip, showing the possible locations of the piezoelectric polymer film force transducers about the circular base.

The optimal position of the transducers 14, 16, and 18 involves two constraints: (1) the columns of the [k] matrix should be orthogonal, and, (2) the columns of the [k] matrix should be of equal length. To determine the optimal position of the transducers 14, 16, 18, and 20 about the base 24, it is assumed that the signals produced by three of the four transducers (the transducers 14, 16, and 18) when a torque is applied can be controlled by strategic placement of the polymer film transducers. It is also assumed that the signal produced by the fourth sensor (20) will be small when normal or tangential forces are applied compared to the signal obtained when a torque is applied. As to the length of the columns, the optimization of equal column lengths is determined by the mechanical dimensions of the sensor tip 10 and therefore equal column lengths cannot be obtained simply by changing the relative position of the transducers 14, 16, and 18 around the base 24 of the sensor tip 10. However, the positions of the transducers about the base 24 of the sensor tip 10 can be manipulated to obtain an orthogonal [k] matrix. Two additional assumptions shall be made. First, when a tangential force is applied perpendicularly to a particular transducer (e.g., transducer 14 in FIG. 5), the signal will be assumed small as compared to the signal obtained when a tangential force is applied parallel to the transducer (e.g., transducer 16 when $\theta_3 = 90°$ in FIG. 5). Each piece of film constituting a transducer is cut to have substantially greater length than width, and it is understood that "parallel" to the transducer means parallel to its length. The anisotropic properties of the piezoelectric film are used advantageously by cutting the film for the transducer so that the transducer is most sensitive to strain along its length. Second, if the tangential force is applied in a direction between perpendicular and parallel to the transducer, it will be resolved in the output signal from the transducer primarily into its perpendicular component. The [k] matrix (excluding the effects due to torque) is given below in Table II:

TABLE II

| | Normal-Z | Tangential-X | Tangential-Y |
|---|---|---|---|
| Transducer 14 | 1 | 1 | 0 |
| Transducer 18 | 1 | $-\cos\theta_2$ | $-\sin\theta_2$ |
| Transducer 16 | 1 | $-\cos\theta_3$ | $\sin\theta_2$ |

By solving the matrix to force the columns to be orthogonal gives:

$\theta_2 = \theta_3 = 60°$.

Although these are the optimal positions calculated, the preferred positions are such that $\theta_2 = 0°$ and $\theta_3 = 90°$ for three reasons. First, the strips of polymer film used as transducers fit on the sensor better at these positions. Second, the effects due to the fOrce components are easier to visualize at these angles. Third, two of the three columns are perpendicular, which provides reasonably good reduction of error propagation.

Figure 9:
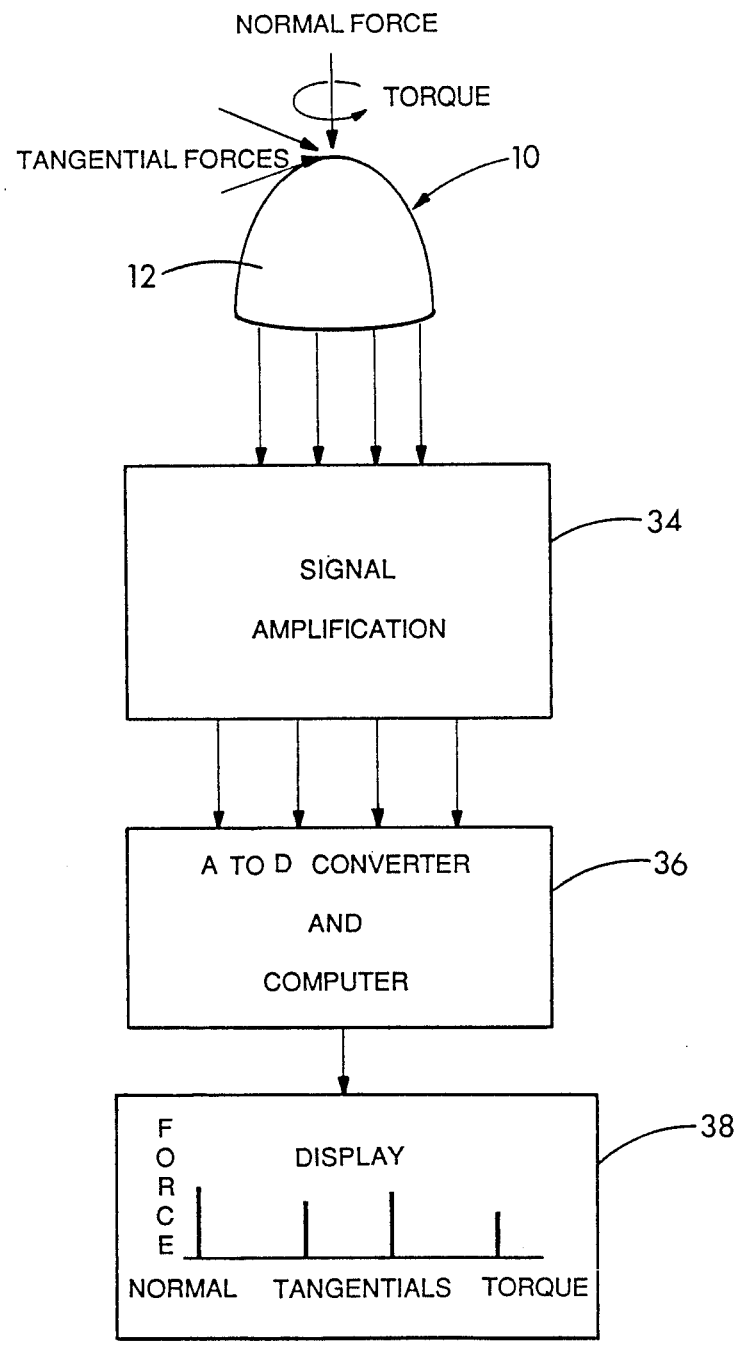
FIG. 9 is a schematic view of the system in accordance with the invention for conversion of strain in the sensor tip, as sensed by the transducers, to the decoupled component forces and torque.

The four transducers 14, 16, 18, and 20 each have a pair of attached wire leads 32 that carry the signal representing the strain detected by each of respective transducers. These leads 32 extend through the bottom of the base 24 and the support plate 31 and are connected to a signal amplifier 34, as shown in FIG. 9. The amplifier 34 is preferably proximal to the elastomeric body 12 to minimize the potential effects of noise acting upon the wire leads 32. The amplified signals may then be provided to an analog to digital converter and computer 36 where the signals are digitized and the digital data analyzed to determine the component forces in accordance with the equations given above. Alternatively, the signal manipulation required to resolve the signals from the transducers into signals representing the four components can be incorporated into a hard wired analog circuit which, for example, could be incorporated into a microchip positioned immediately behind the elastomeric body. A display device 38, such as a video monitor, may be controlled by the computer to show the individual components to an operator, or the data on these components may be used by the computer to control the operation of a robot gripper which has the tactile sensor tips of the invention.

Figure 10:
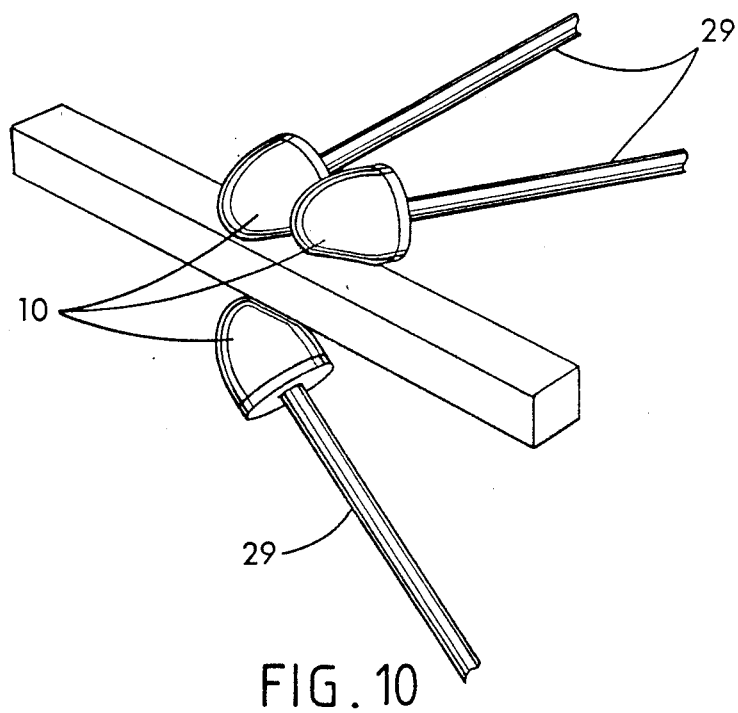
FIG. 10 is an illustrative partial view of a three-point grasp upon an object by a robotic gripper hand having three fingers, each of the fingers having a sensor tip.

Although the sensor tip 10 may be positioned on the end of one finger that forms an extremity to a robotic hand, gripper, probe, or the like, the sensor tip 10 is ideally suited for use with other, similar sensor tips 10 on a robotic hand having multiple fingers. Though most of the prior art robot grippers utilize tactile sensors that can sense in one degree of freedom, i.e., can only detect a normal force upon an object as detected on a two-dimensional array, the use of the sensor tip 10 in a multiple finger robotic hand better emulates the human hand in sensing an object. In many grasping tasks, the human hand will establish three primary points of contact (the end of the thumb and the end of the first and second fingers) with the object to be grasped. In a robotic hand having three fingers and three sensor tips 10 at the end of the fingers, as shown in FIG. 10, an object may be picked up between three points of contact, each of which may relay feedback information to the robot controller. The use of three points of contact in robotic grasping, rather than merely two points of contact using only a normal force, provides a more stable grasp. If a significant torsional component applied to the sensor tips is sensed by the robot controller, the robot will be alerted that the object has not been grasped near its center of gravity. The robot can then put the object down and make adjustments to its grip with the object. If significant tangential force components are sensed by the robot, the robot can be alerted that the object is heavy and may slip from its grasp and it can adjust its grip accordingly so that it will not drop the object.

The performance of the sensor tip 10 under experimental conditions has demonstrated that sensor tips in accordance with the invention have good linearity, minimal hysteresis, good repeatability and range, and minimal interactions between the force components. Linearity of the sensor tip 10 means that the output signals of the transducers are linear for any reasonable magnitude of force which is applied. Without linearity, the above-described equations for decoupling the components may not be accurate.

Figure 11:
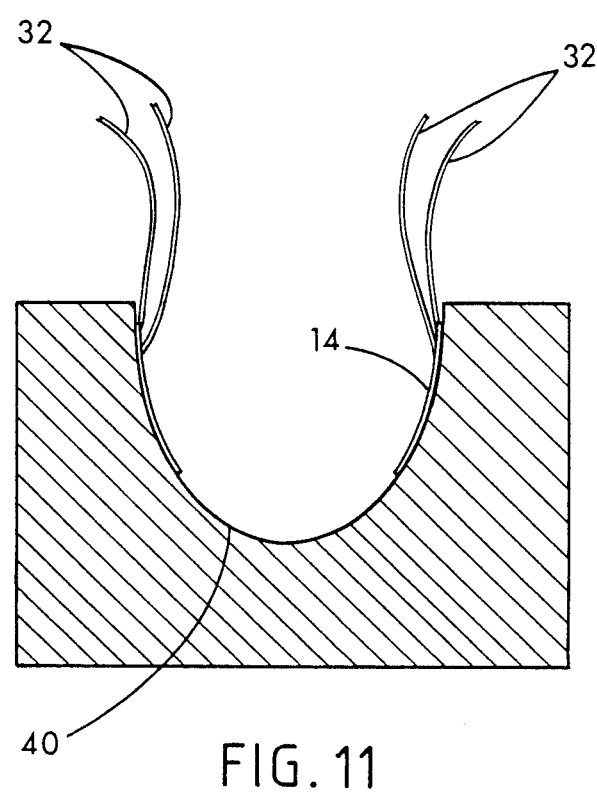
FIG. 11 is a cross-sectional view of a mold which can be used in the manufacture of the sensor tip.

An exemplary procedure for manufacture of the sensor tip 10 is described below and with repsect to FIG. 11 which shows a mold for the sensor tip. The piezoelectric polymer film may first be cut to proper size, with care taken to cut the film with the proper anisotropic orientation along the length of the film. The wire leads 32 are attached to the film by a conductive epoxy (such as is commercially available from Tra-Con, Inc.), though only a minimal amount of epoxy is used so as not to interfere with the mechanical properties of the elastomeric body 12 or the polymer film of the respective transducer. As shown in FIG. 11, the transducers 14, 16, 18, and 20 are then temporarilly affixed to the inside surface 40 of a mold formed in the desired shape for the sensor tip 10. A suitable means of attaching the polymer film of the transducers 14, 16, 18, and 20 to the inside wall of the mold 40 is by rubber cement. The opposing side of the polymer film of the transducers 14, 16, 18, and 20 are coated with a primer (e.g. Dow Corning Primer 1201) to bond the polymer film of the transducers to the silicone rubber of the elastomeric material that forms the body 12. The silicone rubber is a liquid rubber base (such as the commercially available Dow Corning Silicone Rubber RTV 3110, as specified above) and a curing agent, and therefore stirring is required between the base and the agent. To prevent air from being trapped in the rubber during the stirring, which could create voids that effect the mechanical properties of the elastomeric body 12, the rubber is preferably "de-aerated" by placing the rubber into a vacuum bell and decreasing the pressure. Under low pressure, the rubber becomes frothy as the air bubbles expand and burst. When 10% catalyst (e.g., Dow Corning Catalyst "S") is added to the base material, curing time is approximately 8-10 hours. Upon removal from the mold 40, a small amount of curable silicone rubber in liquid form may be layered over the transducers 14, 16, 18, and 20 to aid in the necessary adhesion. Occasionally, when the polymer film of the transducers loses its bond or the rubber of the elastomeric body 12 tears, repairs may also be made with thin layers of silicone rubber, since few materials adhere to cured silicone rubber other than silicone rubber. Because of the simple manufacturing process and the low cost of materials, the sensor tip 10 may be considered consummable in some applications and easily replaced.

It is understood that the invention is not confined to the particular construction and arrangement of parts herein illustrated and described, but embraces such modified forms thereof as come within the scope of the following claims.

What is claimed is:

1. A sensor tip for use in a robotic hand which is capable of manipulating an object, the sensor tip providing feedback information to the robot on forces acting upon the sensor tip by the object, the sensor tip comprising:

(a) an elastomeric body having a three-dimensional outer boundary that contacts the object being manipulated, the body being formed of a relatively compliant material as compared to the object to be manipulated; and (b) means for measuring strain in the elastomeric body at at least two positions near the outer boundary of the body to yield information on a plurality of independent force or torque components acting upon the sensor tip by the object being manipulated.

2. The sensor tip of claim 1 wherein the outer boundary of the body has a base and a convex surface extending from the base, the convex surface having a distal point of maximal distance from the base.

3. The sensor tip of claim 2 wherein the means for measuring strain measures strain at at least three separated positions on the body to yield information on two independent tangential force components and an independent normal force component acting on the body.

4. The sensor tip of claim 3 wherein the means for measuring strain measures strain at four separated positions on the sensor body to yield information on a torque component acting on the body.

5. A sensor tip for use in a robotic hand which is capable of manipulating an object, the sensor tip providing feedback information to the robot on forces acting upon the sensor tip by the object, the sensor tip comprising:
   (a) an elastomeric body having a three-dimensional outer boundary that contacts the object being manipulated, the body being relatively complaint as compared to the object to be manipulated, wherein the material of the elastomeric body is silicone rubber; and
   (b) means for measuring strain in the elastomeric body at at least two positions near the outer boundary of the body to yield information on a plurality of independent force or torque components acting upon the sensor tip by the object being manipulated.

6. The sensor tip of claim 5 wherein the silicone rubber is room temperature volcanized.

7. A sensor tip for use in a robotic hand which is capable of manipulating an object, the sensor tip providing feedback information to the robot on forces acting upon the sensor tip by the object, the sensor tip comprising:
   (a) an elastomeric body having a three-dimensional outer boundary that contacts the object being manipulated, the body being a relatively complaint as compared to the object to be manipulated, wherein the outer boundary of the body has a base and a convex surface extending from the base, the convex surface having a distal point of maximal distance from the base; and
   (b) means for measuring strain in the elastomeric body at at least one position near the outer boundary of the body to yield information on force or torque components acting upon the sensor tip by the object being manipulated wherein the means for measuring strain comprises transducers which produce an electrical signal indicative of strain.

8. The sensor tip of claim 7 wherein the transducers are strips of piezoelectric polymer film.

9. A sensor tip for use in a robotic hand which is capable of manipulated an object, the sensor tip providing feedback information to the robot on forces acting upon the sensor tip by the object, the sensor tip comprising:
   (a) an elastomeric body having a three-dimensional outer boundary that contacts the object being manipulated, the body being formed of a relatively complaint material as compared to the object to be manipulated; and
   (b) means for measuring in the elastomeric body at a plurality of positions separated near the outer boundary of the body to yield information on a plurality of independent force of torque components acting upon the sensor tip by the object being manipulated.

10. The sensor tip of claim 9 wherein the outer boundary of the body has a base and a convex surface extending from the base, the convex surface having a distal point of maximal distance from the base.

11. The sensor tip of claim 10 wherein the base is circular and the ratio of the distance between the base and the distal point to the diameter of the base is between 0.5 and 1.0.

12. The sensor tip of claim 11 wherein the ratio of the maximal distance between the base and the distal point to the diameter of the base is 0.8.

13. The sensor tip of claim 10 wherein the outer boundary is a portion of an ellipsoid having a major axis and a minor axis, the portion of the ellipsoid being not greater than a section taken halfway along the major axis.

14. The sensor tip of claim 13 wherein the ratio of the length of the major axis to the minor axis is between 1.0 and 2.0.

15. The sensor tip of claim 14 wherein the ratio of the length of the major axis to the minor axis is about 1.6.

16. The sensor tip of claim 10 wherein the means for measuring strain are four transducers which produce an electrical signal indicative of strain, and wherin at least one of the transducers is electrically anisotropism is helical about the convex surface.

17. A sensor tip of claim 10 wherein the means for measuring strain conprises: at least three transducers attached to the body at separated positions to measure strain in the body near the outer boundary of the body, each of the transducers producing an electrical signal indicative of strain on the body resulting from manipulation of the object to yield information on independent force and/or torque components acting upon the sensor tip by the object being manipulated.

18. The sensor tip of claim 17 wherein the transducers are strips of piezoelectric polymer film.

19. The sensor tip of claim 18 wheein the piezoelectric polymer film is composed of a material having a relatively low modulus of elasticity.

20. The sensor tip of claim 18 wherein the piezoelectric polymer film is polyuvinylidene fluoride.

21. The sensor tip of claim 17 wherein at least three transducers are each anisotropic with respect to its output signal as a function of the direction of strain in the transducer, and each is positioned so that the orientation of anisotropism is on a line directed radially outwardly on the convex surface from the distal point.

22. The sensor tip of claim 21 wherein at least one additional transducer is anisotropic with respect to its output signal as a function of the direction of strain in the transducer, and is positioned so that the orientation of anisotropism is helical about the convex surface.

23. The sensor tip of claim 9 wherein the material of the elastomeric body is silicone rubber.

24. The sensor tip of claim 23 wherein the silicone rubber is room temperature vulcanized.

25. The sensor tip of claim 9 wherein the material of the elastomeric body has a Shore Hardness rating in the range 45–55.

26. The sensor tip of claim 9 wherein the means for measuring strain are transducers which produce an electrical signal indicative of strain.

27. The sensor tip of claim 26 wherein the transducers are strips of piezoelectric polymer film.

28. The sensor tip of claim 27 wherein the piezoelectric polymer film is composed of a material having a relatively low modulus of elasticity.

29. The sensor tip of claim 27 wherein the piezoelectric polymer film is polyvinylidene fluoride.

30. The sensor tip of claim 26 wherein the outer boundary of the body has a base and a convex surface having a distal point of maximal distance from the base, and wherein three transducers are each anisotropic with respect to its output signal as a function of the direction of the strain in the transducer, and each is positioned so that the orientation of anisotropism is on a line directed radially outwardly on the convex surface from the distal point.

31. The sensor tip of claim 26 wherein the transducers are positioned near the base.

32. The sensor tip of claim 31 wherein the centers of the transducers are positioned at an angle of 70° from a line normal to the base.

33. A sensor tip system for use in a robotic hand which is capable of manipulating an object, the sensor tip system providing feedback information to the robot on forces acting upon the sensor tip by the object, the system comprising:
  (a) an elastomeric body having a three-dimensional outer boundary that contacts the object being manipulated, the body being formed of a relatively complaint material as compared to the object to be manipulated;
  (b) at least three transducers attached to the body at separated positions near the outer boundary of the body, each of the transducers producing an electrical signal indicative of strain on the body resulting from manipulation of the object to yield information on a plurality of independent force or torque components acting upon the sensor tip by the object being manipulated; and
  (c) means for decoupling the electrical signals produced by the transducers to resolve independent components of force or torque acting upon the body.

34. The sensor tip system of claim 33 further comprising an amplifier to amplify the electrical signals produced by the transducers and supplying the amplified signals to the means for decoupling.

35. The sensor tip system of claim 34 wherein the amplifier is adjacent to the body.

36. A robotic hand capable of manipulating an object, the robotic hand comprising: three fingers each having sensor tips, each of the sensor tips being able to direct multiple force components and each of the sensor tips being positionable by the robot so as to contact the object at three separate points, wherein each of the sensor tips comprises:
  (a) an elastomeric body having a three-dimensional outer boundary that contacts the object being manipulated, the body being formed of a relatively complaint material as compared to the object to be manipulated; and
  (b) means for measuring strain in the elastomeric body at at least three separated positions near the outer boundary of the body to yield information on a plurality of independent force or torque components acting upon the sensor tip by the object being manipulated.

37. The robotic hand of claim 36 wherein the means for measuring strain in each sensor tips comprises: at least three strain transducers attached to the body near the outer boundary of the body, each of the transducers producing an electrical signal indicative of strain on the body resulting from manipulation of the object to yield information on component forces acting upon the sensor tip by the object being manipulated.

38. The robotic hand of claim 37 including a fourth strain transducer attached to the body of each sensor tip and positioned to measure torque applied to the body.

39. The robotic hand of claim 38 further including: means for decoupling the electrical signals produced by the transducers in the sensor tip to resolve the components of force and torque acting upon the body of each sensor tip.

* * * * *

UNITED STATES PATENT AND TRADEMARK OFFICE
CERTIFICATE OF CORRECTION

PATENT NO.   :   4,982,611

DATED        :   January 8, 1991

INVENTOR(S)  :   Lorenz, et al.

It is certified that error appears in the above-identified patent and that said Letters Patent is hereby corrected as shown below:

```
Column 1, line 55 insert --; -- after "are".
Column 2, line 5 insert --; -- after "freedom".
Column 9, line 7 "fOrce" should be --force--.
Column 11, line 27 "complaint" should be --compliant--.
Column 11, line 46 "complaint" should be --compliant--.
Column 12, line 1 "complaint" should be --compliant--.
Column 12, line 3 insert --strain-- after "means for measuring".
Column 12, line 6 " force of torque" should be --force or torque--.
Column 12, line 32 "wherin" should be --wherein--.
Column 12, line 33 insert --anisotropic and is positioned so
    that the orientation of-- after "electrically".
Column 12, line 50 "polyuvinylidene" should be --polyvinylidene--.
Column 13, line 33 "complaint" should be --compliant--.
Column 14, line 11 "direct" should be --detect--.
Column 14, line 19 "complaint" should be --compliant--.
```

Signed and Sealed this

Twenty-fifth Day of August, 1992

Attest:

DOUGLAS B. COMER

Attesting Officer

Acting Commissioner of Patents and Trademarks